H. KOPPERS.
PROCESS FOR CONTROLLING COMBUSTION IN COKING PLANTS.
APPLICATION FILED JUNE 8, 1914.
1,176,066.
Patented Mar. 21, 1916.
10 SHEETS—SHEET 1.
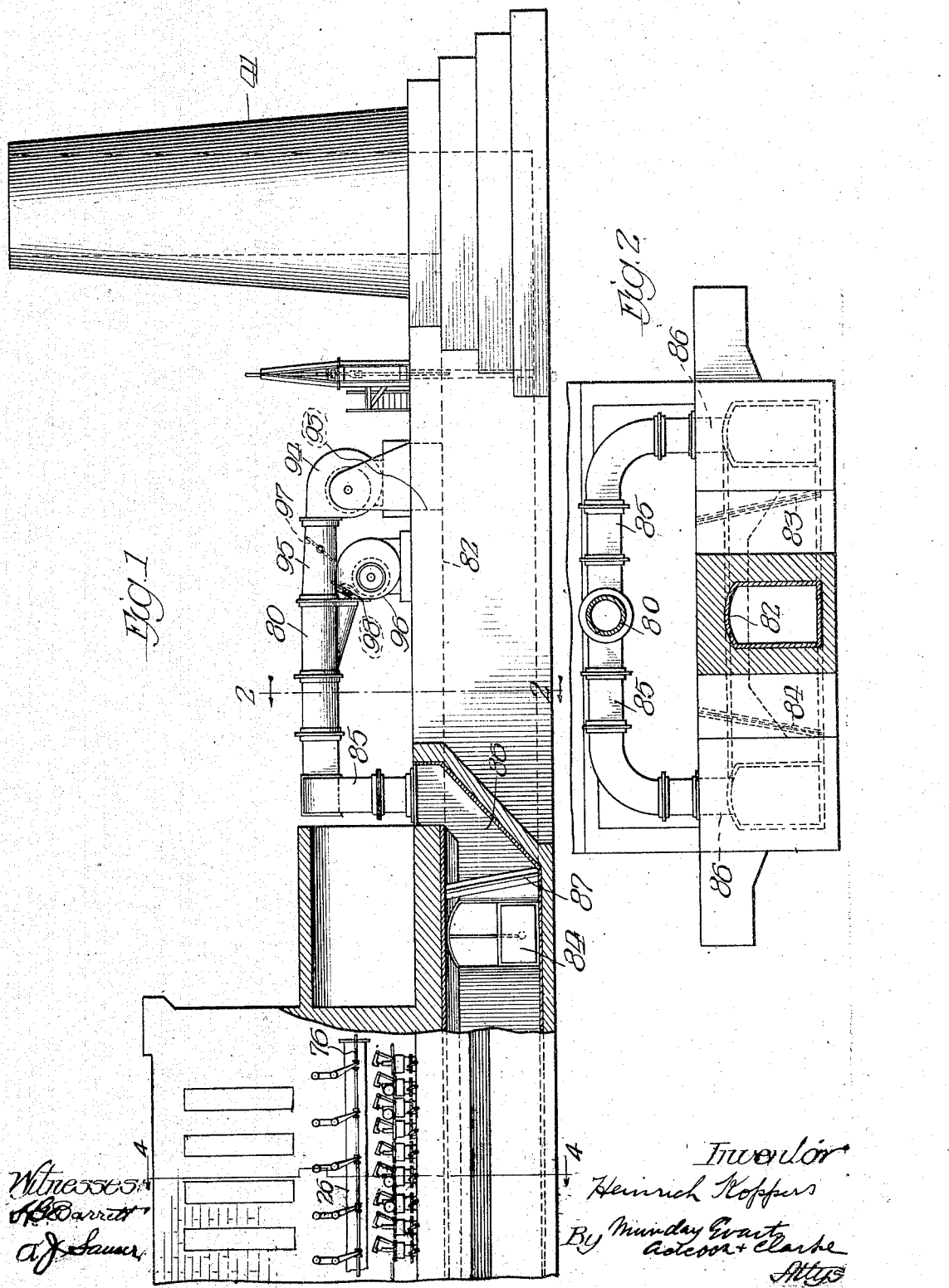

H. KOPPERS.
PROCESS FOR CONTROLLING COMBUSTION IN COKING PLANTS.
APPLICATION FILED JUNE 8, 1914.
1,176,066.
Patented Mar. 21, 1916.
10 SHEETS—SHEET 2.
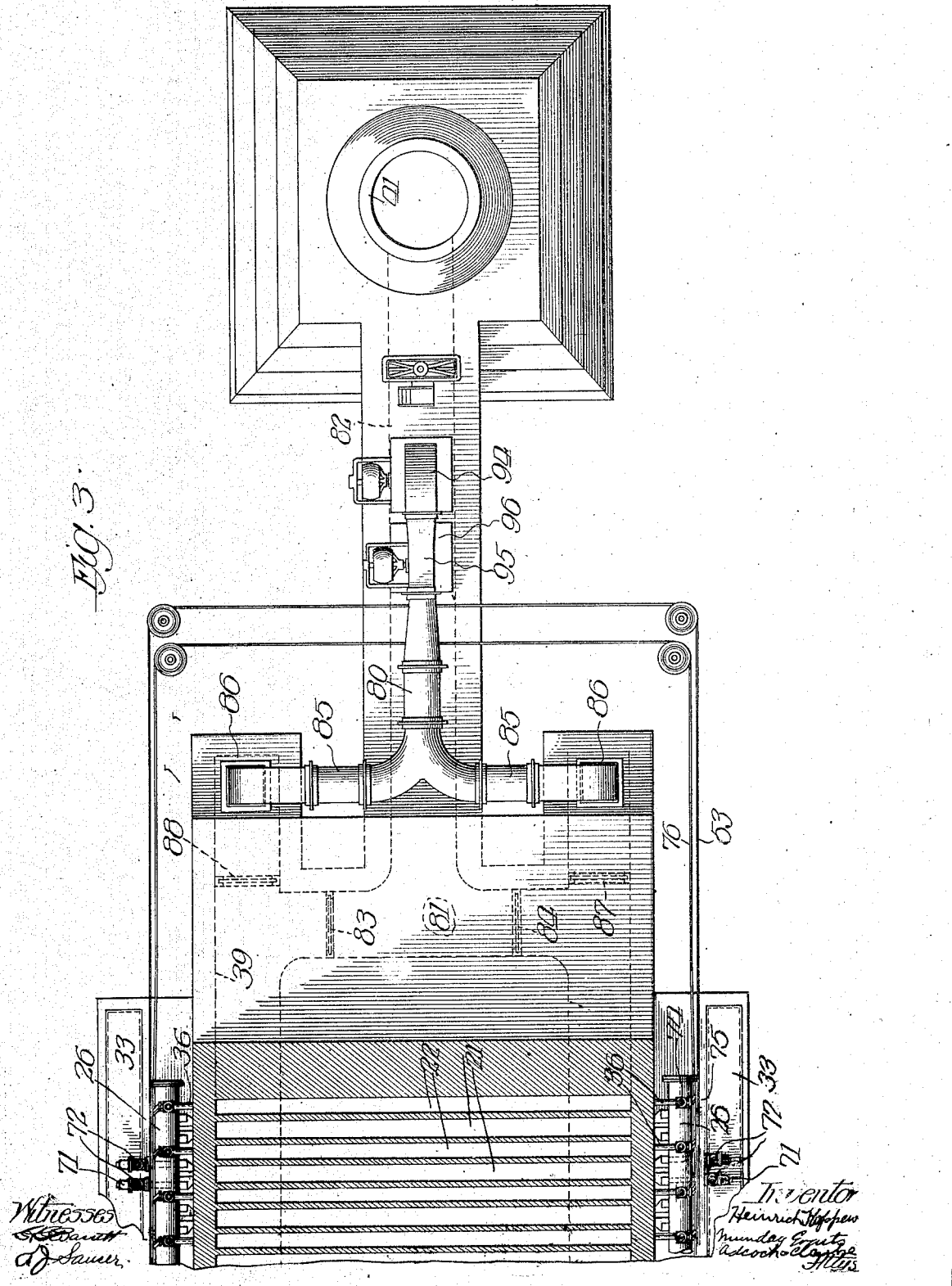

H. KOPPERS.
PROCESS FOR CONTROLLING COMBUSTION IN COKING PLANTS.
APPLICATION FILED JUNE 8, 1914.
1,176,066.
Patented Mar. 21, 1916.
10 SHEETS—SHEET 3.
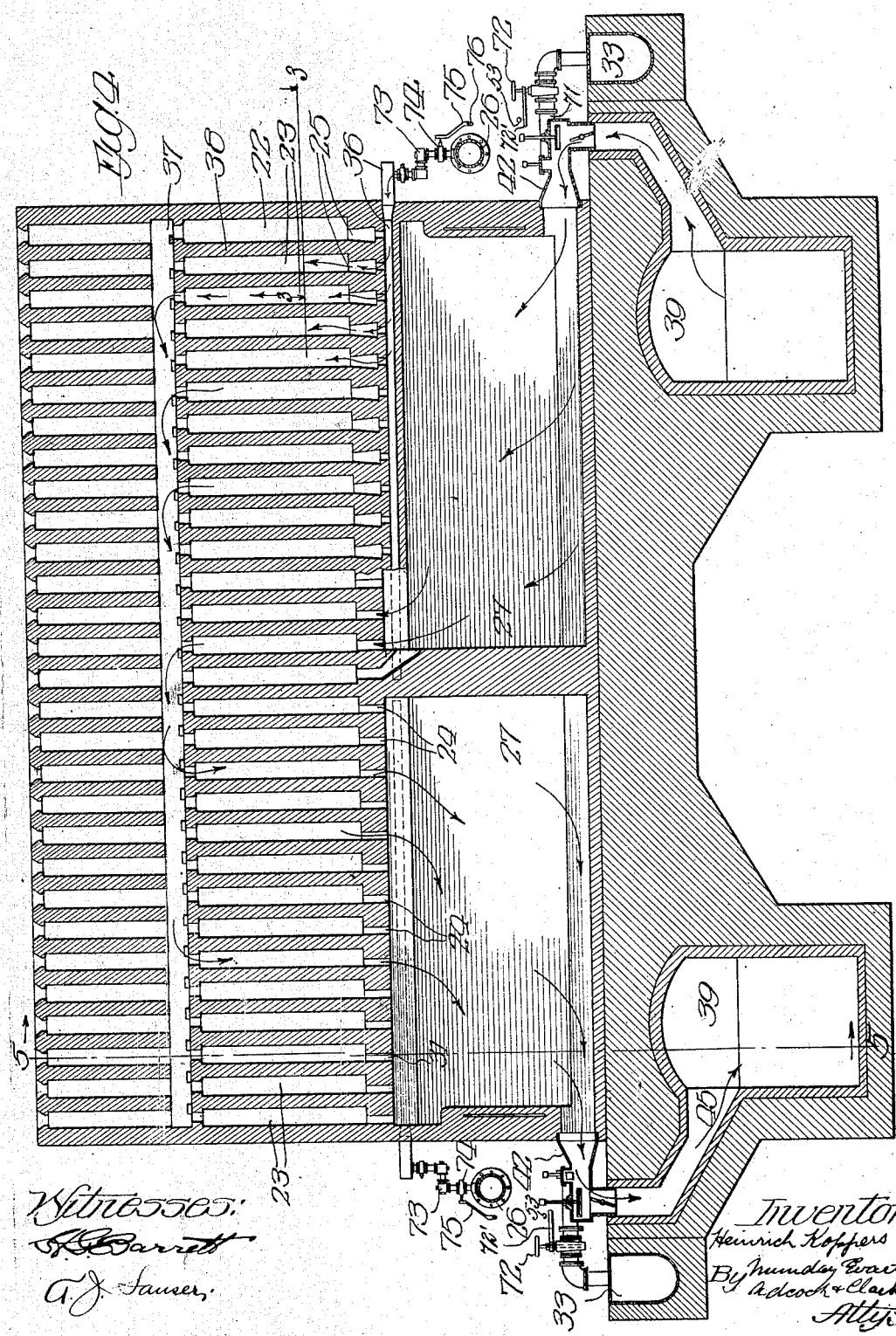

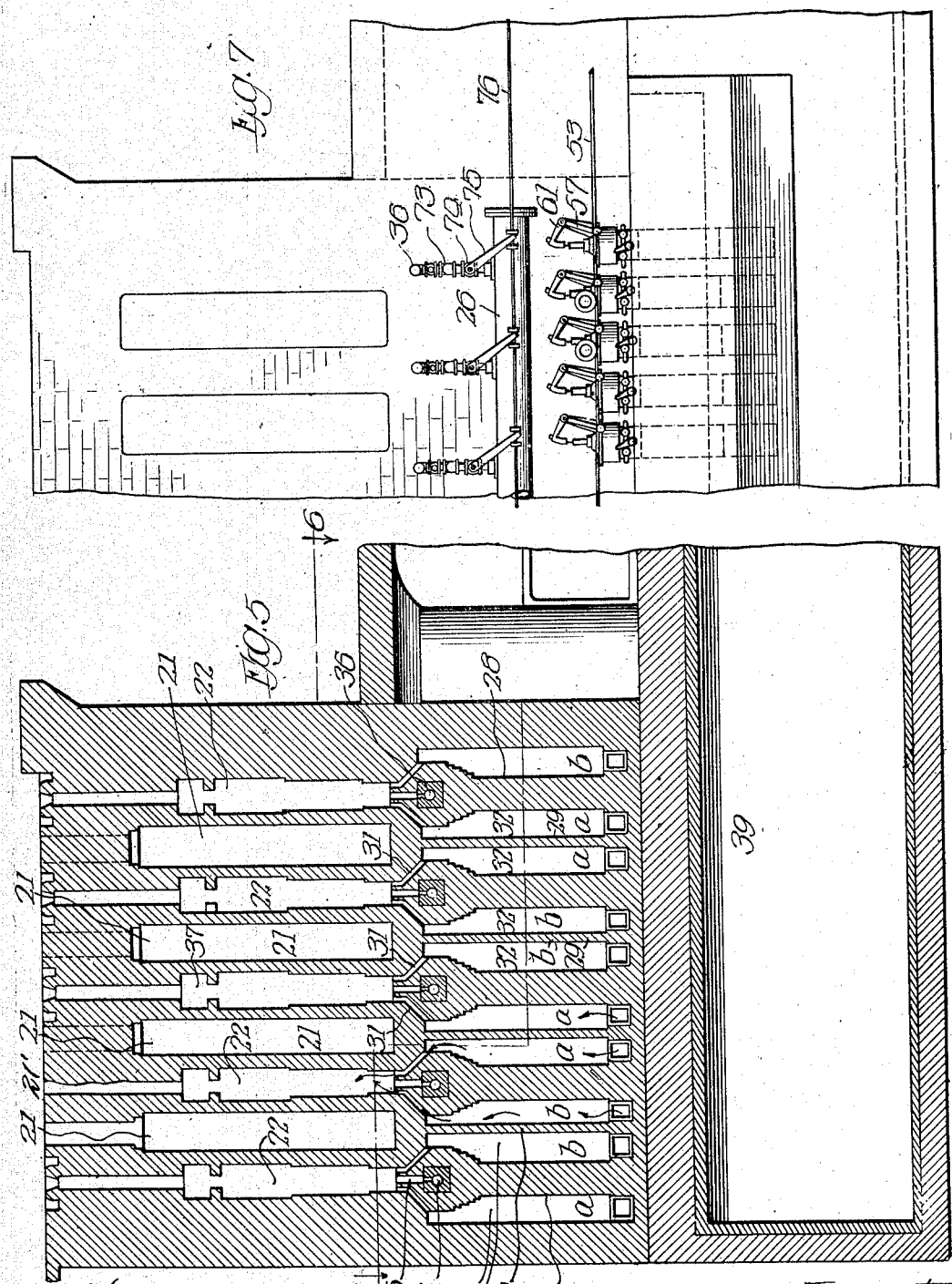

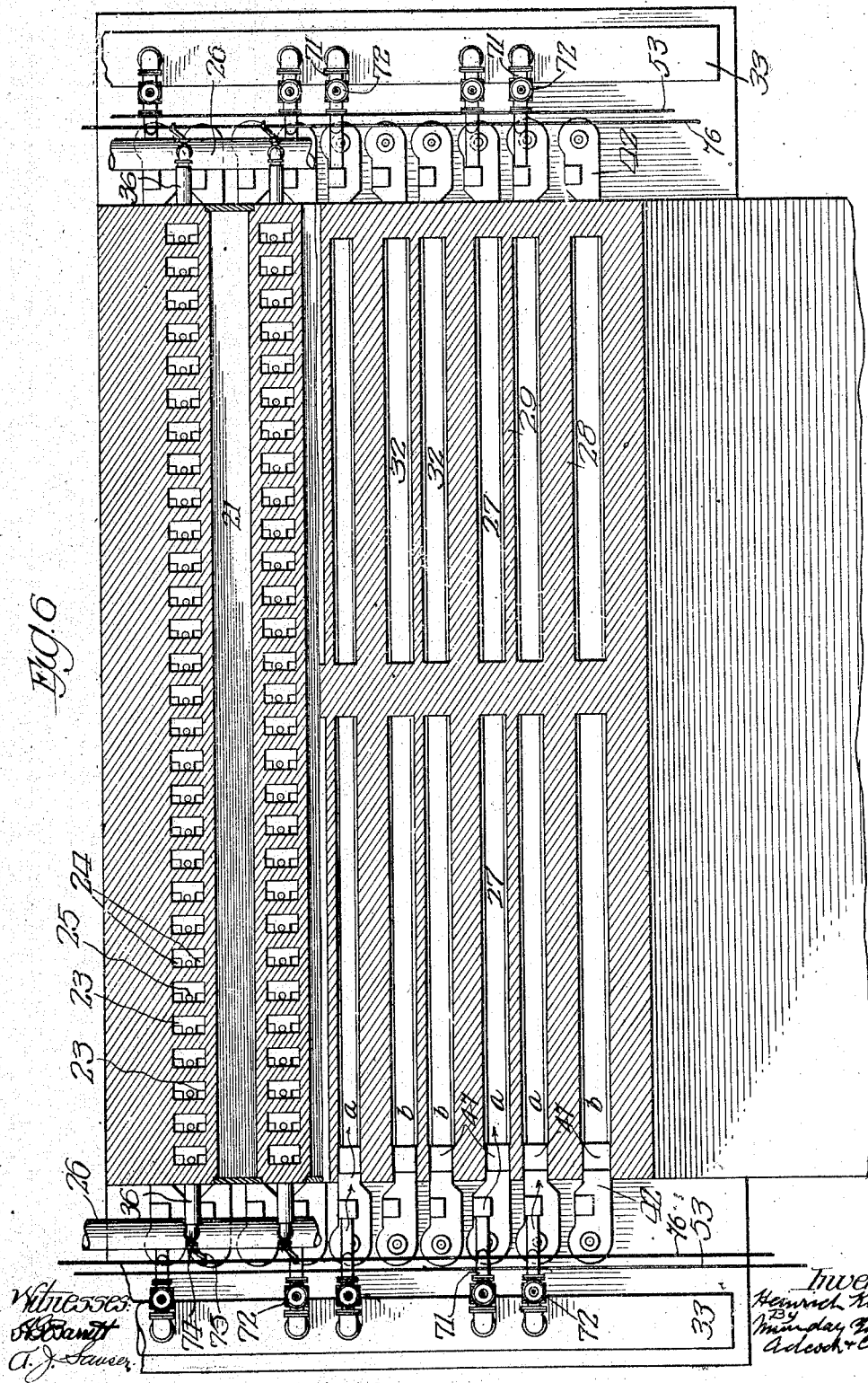

H. KOPPERS.
PROCESS FOR CONTROLLING COMBUSTION IN COKING PLANTS.
APPLICATION FILED JUNE 8, 1914.
1,176,066.
Patented Mar. 21, 1916.
10 SHEETS—SHEET 6.
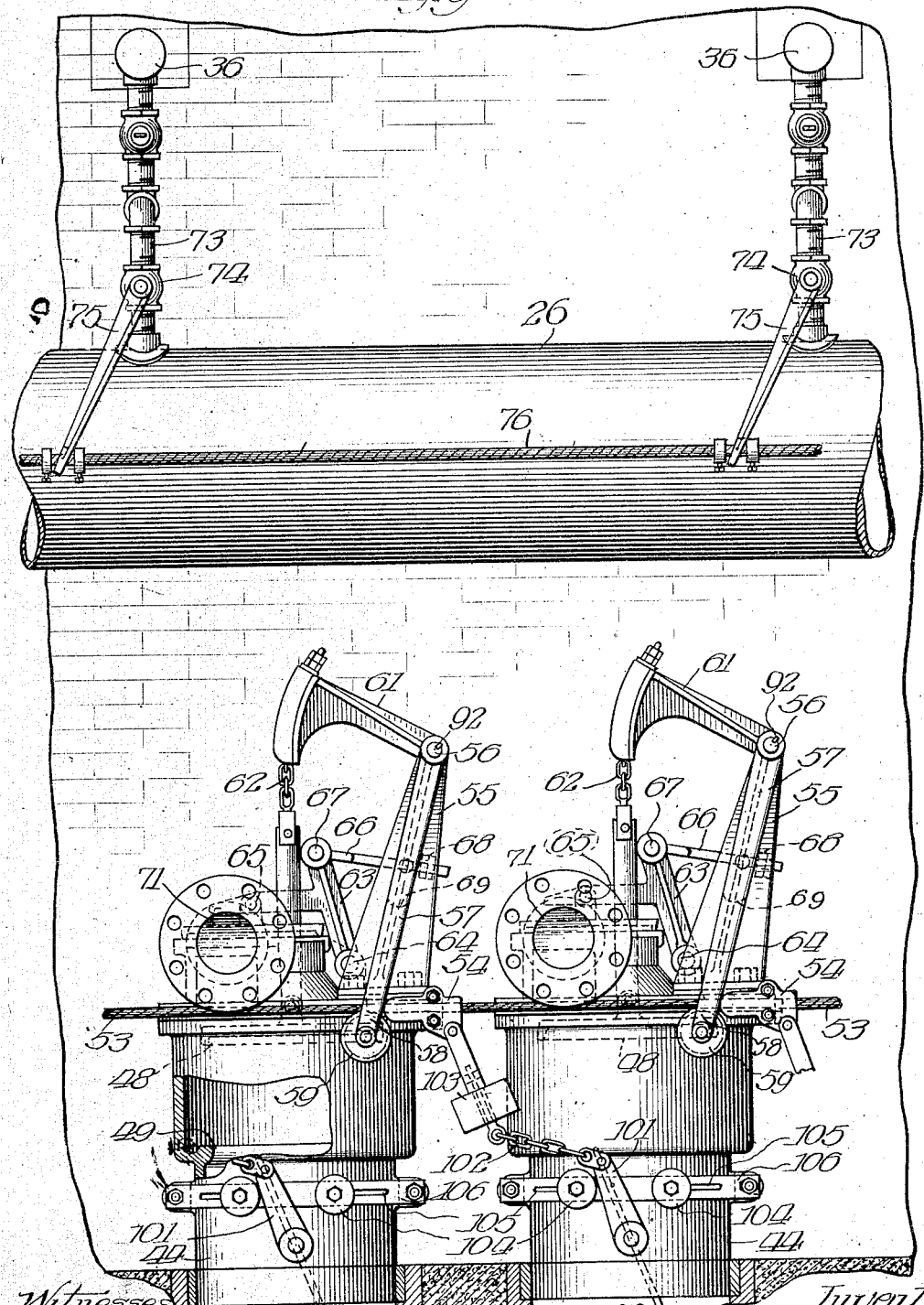

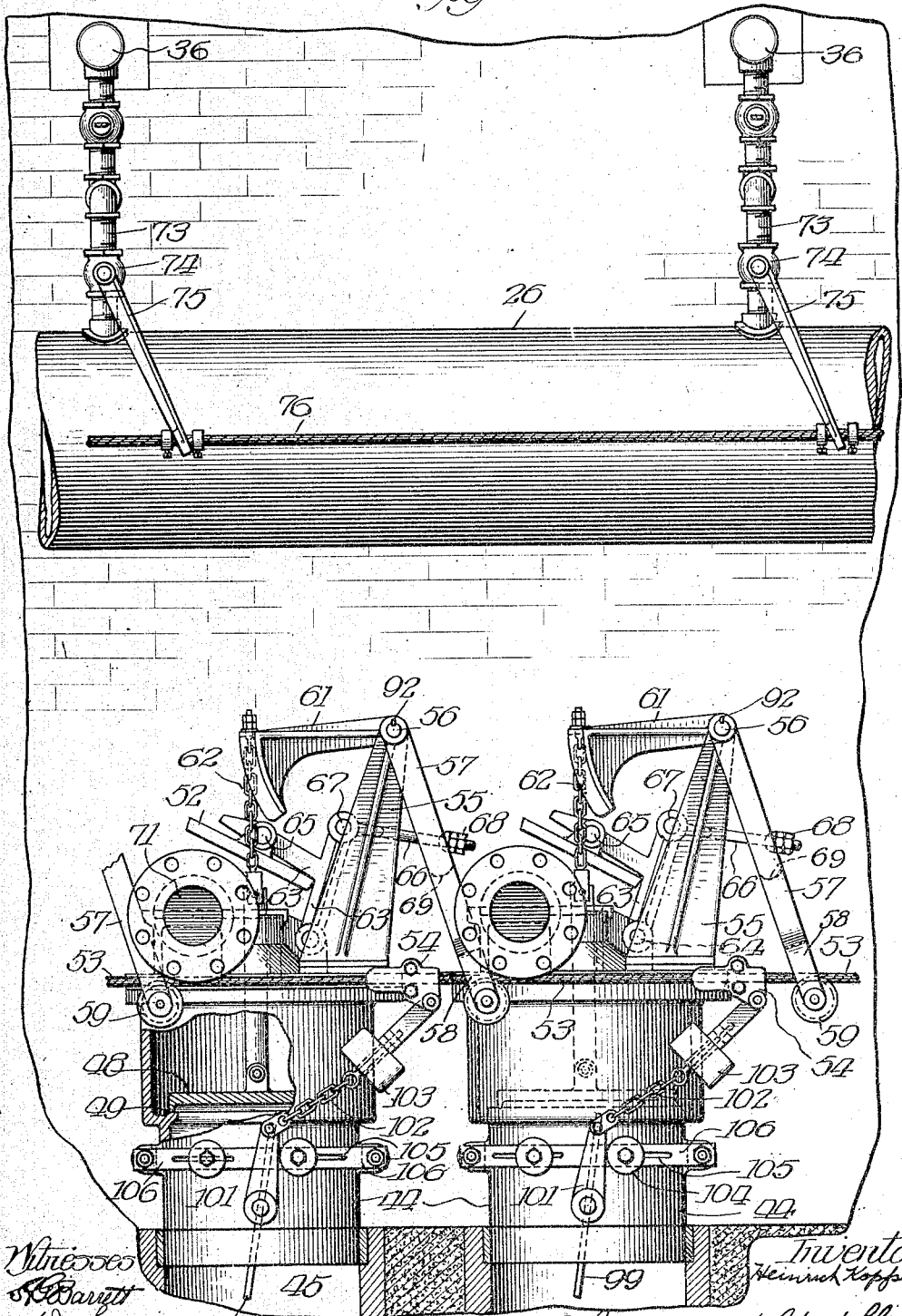

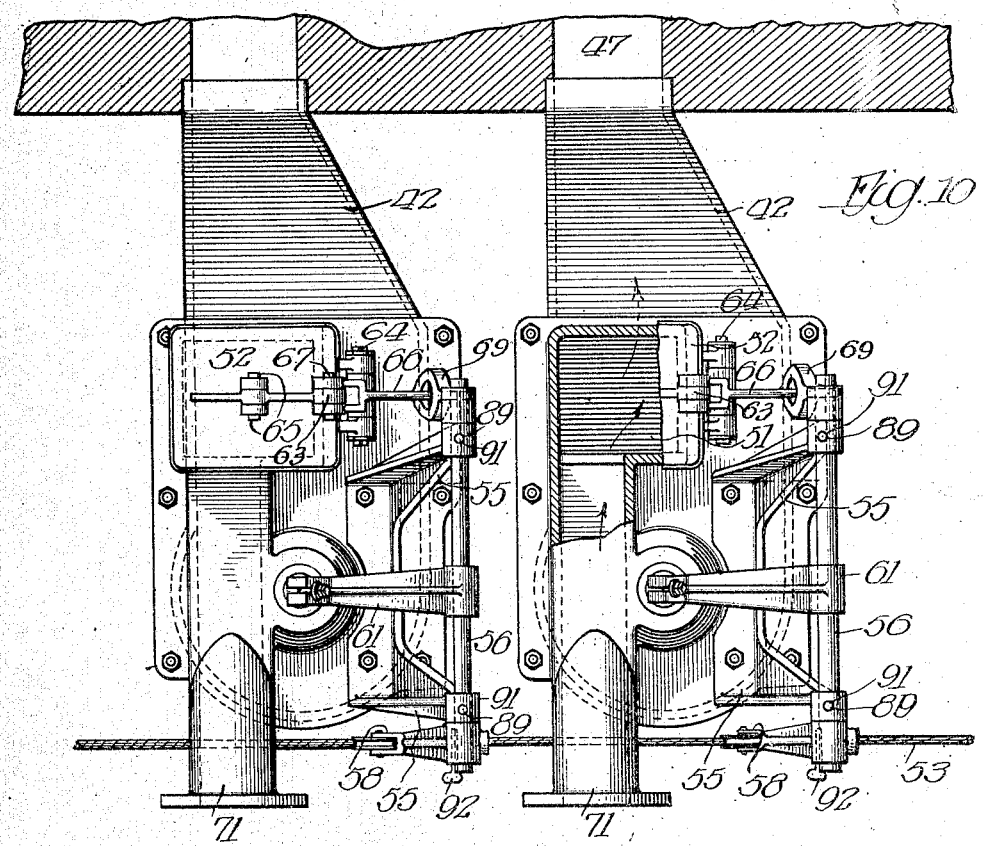
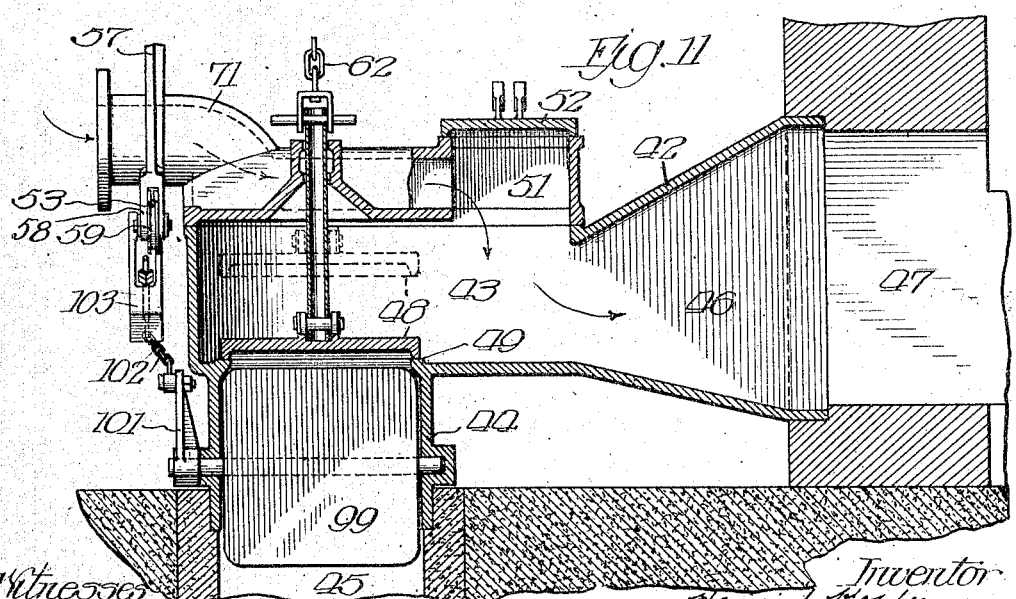

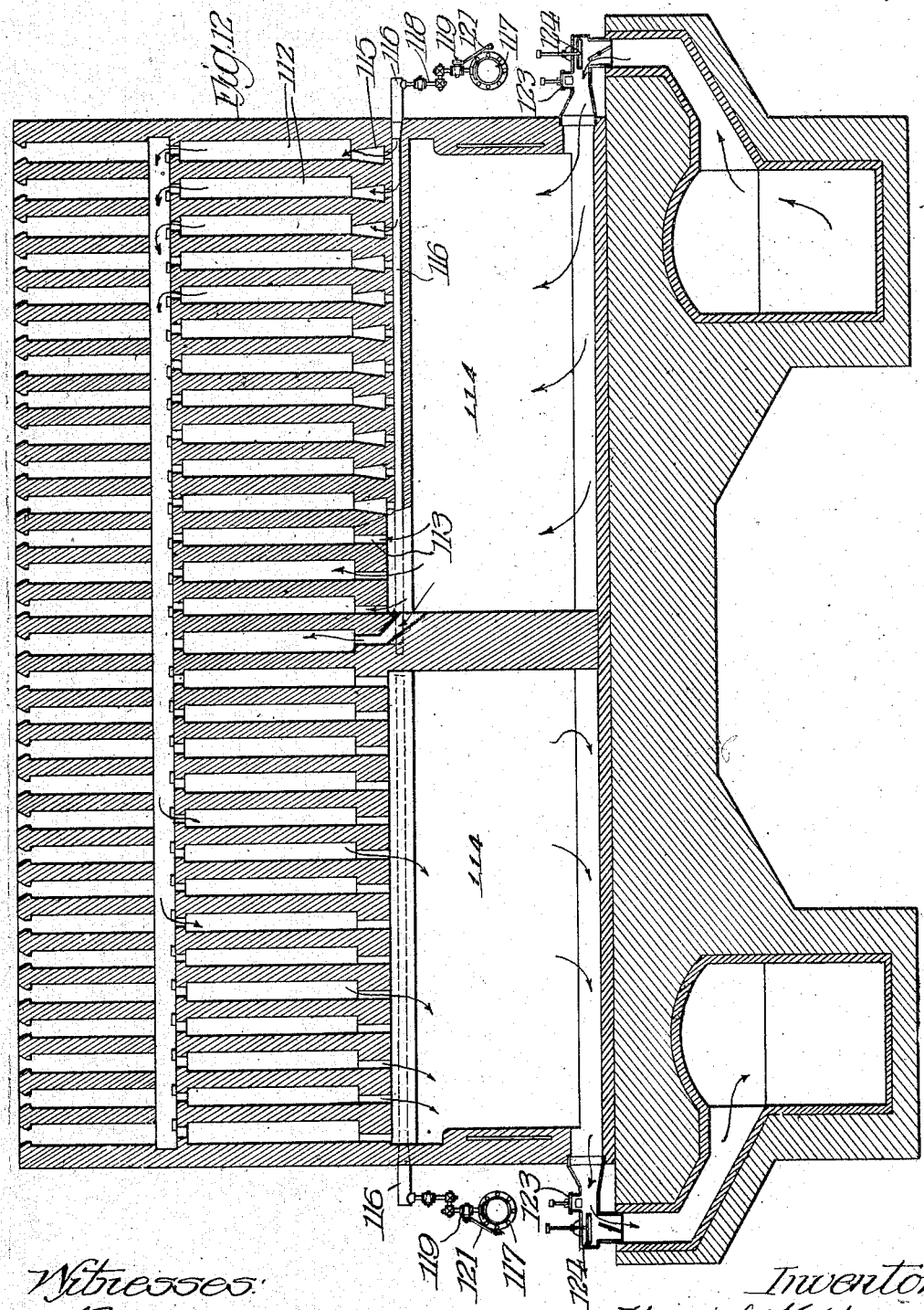

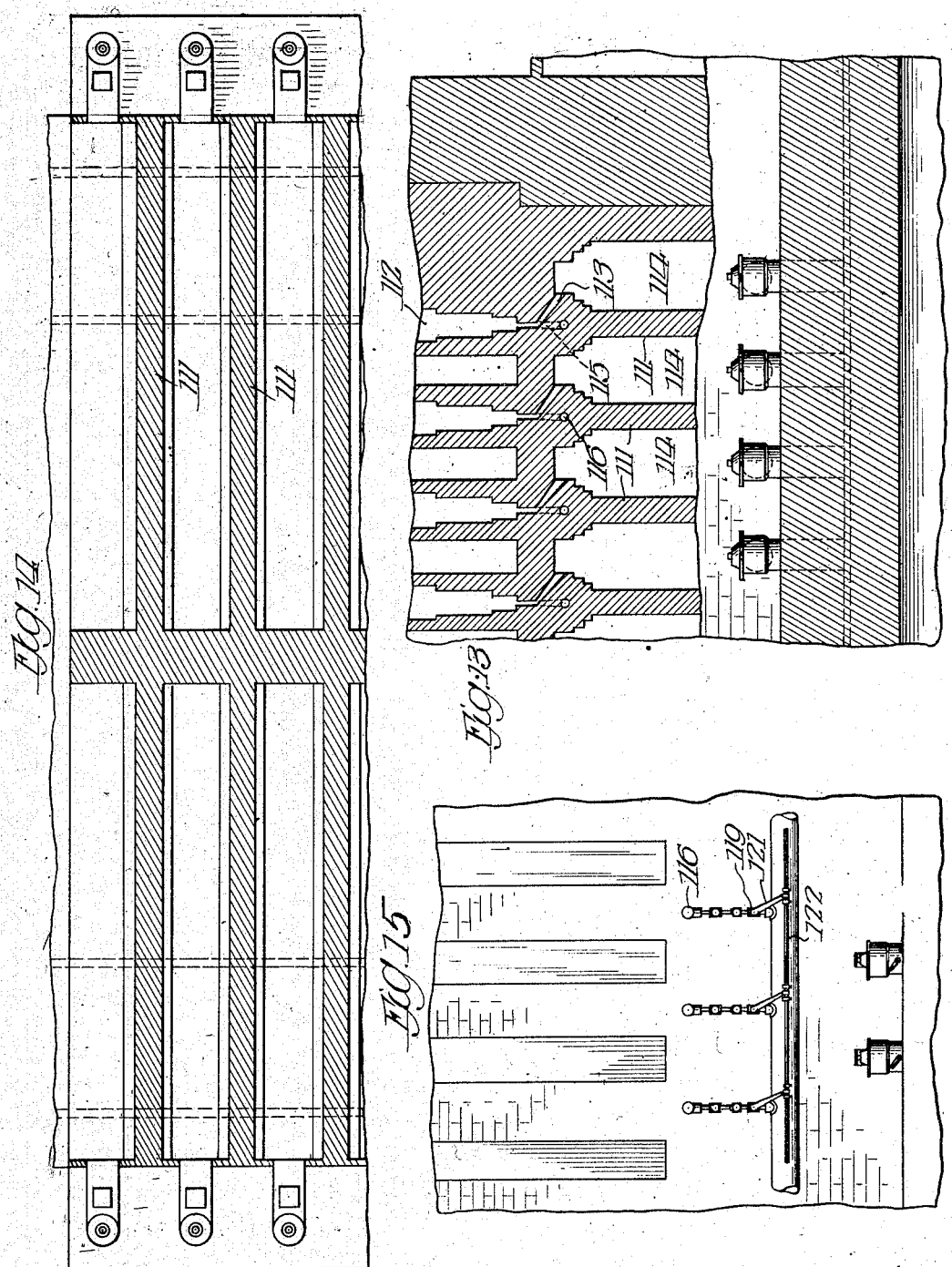

UNITED STATES PATENT OFFICE.

HEINRICH KOPPERS, OF ESSEN-ON-THE-RUHR, GERMANY, ASSIGNOR, BY MESNE ASSIGNMENTS, TO H. KOPPERS COMPANY, A CORPORATION OF PENNSYLVANIA.

PROCESS FOR CONTROLLING COMBUSTION IN COKING PLANTS.

1,176,066.     Specification of Letters Patent.     Patented Mar. 21, 1916.

Application filed June 8, 1914. Serial No. 843,705.

*To all whom it may concern:*

Be it known that I, HEINRICH KOPPERS, a subject of the Emperor of Germany, residing at Essen-on-the-Ruhr, Germany, have invented a new and useful Improvement in Processes for Controlling Combustion in Coking Plants, of which the following is a specification.

My invention relates to the control of the combustion of the fuel used for coking in coking plants and the like and more particularly to the control of the combustion of fuels of rapid combustibility.

Prior to my invention material inconvenience and loss have been experienced in the utilization of the gas from the coking chambers, which is a very rapidly combustible gas although of medium calorific value, by reason of the rapid combustion of the gas near its inlets into the combustion chambers. Gas of this character being rich in hydrogen burns quickly and with great heat and in combustion chambers of coking plants which are of relatively great height this burning tends to occur mainly in the lower portions of the combustion chambers. The heat produced has thus been concentrated toward the bottom so that the lower portions or layers of the coking coal in the coking chambers have sustained the coking heat from the combustion chambers in much greater degree than have the upper or topmost layers or portions. The evils of this are both numerous and important. This heat upon occasion has been greater than the best fire proof materials can withstand and rapid deterioration of the walls of the chambers has resulted. Numerous by-products, including certain distillates, derived in the conversion of coal into coke are of great value in the industry and must be haved, but the concentration of heat in the combustion of this rich fuel near the bottom of the combustion chamber has been found frequently to have produced a temperature so high in the lower portions of the coking chambers that these by-products have deteriorated or been destroyed for commercial use. The intense heat sustained in this portion of the coking chambers must be prolonged until the heat of less temperature has penetrated the walls near the top of the oven and reduced the coal of the upper layers to coke, thereby wasting much valuable time and fuel, and also often affecting the quality of the coke produced. The use of rich coke-oven or other gas of high hydrogen content has commonly therefore been the source of loss of valuable by-products by reason of the intense heating of the lower portions of the coke-mass and also loss of valuable time and fuel by reason of the length of time which combustion must take place to further coke the upper layers of the coal.

I am aware that various devices and expedients have been tested and employed to overcome these objections and with sufficient success to render the utilization of gas of this character in coking plants efficient commercially.

It is broadly the object of this invention, however, to provide a process which will permit coke-oven or other gas rich in hydrogen to be much more efficiently and economically employed than has heretofore been possible in coking plants and to permit it to be burned at safe yet highly effective temperatures without danger of injuring or destroying the plant or any of the valuable commercial by-products obtainable in the conversion of coal into coke and which will accomplish the conversion of all of the coal in the coking chambers into coke simultaneously and in the shortest possible time through the even distribution of proper heat to all parts of the partition walls between the coking and combustion chambers.

It is a further object of the invention to provide a process for controlling the combustion in coking plants and the like which will permit either a slowly combustible gas or a rapidly combustible gas to be employed with high efficiency in a coking plant and without alternations or reconstruction of the internal structure of the plant.

The problem is complicated by considerations that have to do with the character and sources of the fuel gases employed, the necessity for maintaining uniformity of heating, the need for avoiding localized extremes of temperature, the need for conserving the heat in the oven system, the need for avoiding such extremes of stack-draft as will tend to wastage of heat, the need for avoiding such reductions of the cross-area of flues and ports as will tend toward accumulation of soot-deposits and consequent clogging,—and other conditions that may present themselves in the building and operation of modern coke-ovens, which are structures of such magnitude and operated at such high temperatures that the control of combustion in them must be as nearly automatic as possible and yet accomplished by extremely simple and positive mechanism and construction that is not liable to any disarrangement or disorder.

The heating of the coke-oven with its own gas, that is, by burning in its flues coke-oven gas distilled from the coke being produced in its coking chambers, may sometimes be an economy and at other times an expense, according to the demand for other and more profitable uses for such coke-oven gas. Such operation of the coke-oven consumes a great portion (for instance, it may be 50%) of the oven gas distilled by it. On the other hand, if the coke-oven be operated with producer gas or blast furnace gas, the entire distillation of coke-oven gas may be utilized for other purposes. Varying conditions of demand for the coke-oven gas for such other purposes render it desirable that a battery of coke-ovens may be operated alternatively, and alternatively either in whole or in part with either coke-oven gas or gas from an outside source, such as producer gas, and yet such shifting from the employment of one fuel gas to the employment of the other needs to be accomplished without requiring change of the construction of the oven system and without involving change of the heating conditions. It is also the fact that even when only provision for firing with coke-oven gas is made, without alternative provision for firing with producer gas, difficulties are presented in uniformly distributing the heating and avoiding localized extremes of intensity, because the great height and other dimensions of modern coke-oven construction call for extreme elongation of the combustion-flues, and with such extreme elongation of the flues—and in view of the desirability of introducing the fuel-gas at only one end of each flue, to avoid the sooting tendency that results from injecting the gas at two or more points along the flue—the extreme velocity of combustion of coke-oven gas, burned with pre-heated air, causes the combustion to tend to be concentrated toward one end of, rather than distributed through, the elongated combustion-flue, although a flue of the same dimensions might be fired with preheated producer gas and preheated air and give thoroughly efficient distribution of heating and avoidance of localized overheating.

Coke-oven gas is of but medium calorific value as compared, on the one hand, with the low calorific value of producer gas, and, on the other hand, with the high calorific value of such gases as natural gas. But coke-oven gas has a very high velocity of combustion as compared with either producer gas or natural gas. The large proportion of inert constituents in producer gas render it relatively slowly combustible. And the large proportion of methane in natural gas, though giving it very high calorific value, renders it relatively slowly combustible because of the decomposition the methane must undergo in the combustion. On the other hand, coke-oven gas has an extremely high velocity of combustion because of its large hydrogen content. The maximum velocity of combustion of hydrogen is about 2 meters per second, while, for instance, the velocity of combustion of methane with cold air is only about .27 meter per second, an eight-fold difference. The calorific value of methane is over 8000 calories, and the calorific value of natural gas ranges toward 8000 calories.

A fairly typical coke-oven gas, having a calorific value of about 4000 calories, is constituted as follows:

| | |
|---|---|
| $CO_2$ | 1.1% |
| $I_{11}$ | 2.2% |
| $O_2$ | 0.2% |
| $CO$ | 4.4% |
| $H_2$ | 56.2% |
| $CH_4$ | 24.5% |
| $N_2$ | 11.4% |
| | 100.0% |

The proportion of hydrogen is very large, and the proportion of inert constituents is very small. The air requirement of such a gas is about 4.55 cbm., giving 5.55 cbm. burned gas. A fairly typical producer gas, having a calorific value of under 900 calories, is constituted as follows:—

| | |
|---|---|
| $CO$ | 26.0% |
| $CO_2$ | 12.7% |
| $H_2$ | 3.0% |
| $CH_4$ | 0.3% |
| $N_2$ | 58.0% |
| | 100.0% |

The proportion of hydrogen is very small, the combustible constituent is almost entirely carbon monoxid and the proportion of inert constituents is very large. The air requirement of such a gas is about .77 cbm., giving 1.77 cbm. burned gas. To secure the requisite temperature, the producer gas needs to be preheated, and also the air for its combustion. The coke-oven gas cannot be preheated, but the air for its combustion is preheated regeneratively to conserve the heat of the system, and such preheating of the air of combustion further accelerates the velocity of combustion. With cold air of combustion, the velocity of combustion of the coke-oven gas would be greatly less, but there would be a great loss of waste heat as a result of omitting regeneration. If natural gas were used, it could not be preheated efficiently, as heavy deposits of soot would result from the breaking up of the hydrocarbons, and preheating the air of combustion would give excessive temperature, and consequently regenerative conservation of the heat of the system could not be effected practically. Thus in dealing with coke-oven gas as a fuel gas for modern coke-oven constructions, it becomes necessary to take account of its calorific value as much higher than that of producer gas, though much lower than that of natural gas, and of the high temperatures and extreme velocity of combustion that result from burning it, especially with preheated air of combustion, as compared with the moderate temperatures and far lower velocity of combustion that result in burning preheated producer gas with preheated air, and as contrasted also with the excessive temperatures that would result from burning natural gas with preheated air, although the velocity of combustion of natural gas is far lower. The proportion of burned gas resulting, in the combustion of coke-oven gas, as compared with the combustion of producer gas, also obviously affects the matter of providing effective draft conditions and regenerative conserving of heat.

As a further illustration of the matter from another point of view, it may be noted that the controlling of the combustion of coke-oven gas to equivalency with the combustion of producer-gas or blast-furnace gas in these coke-ovens involves such proportioning of the admixture of flue gas as shall reduce toward substantial equivalency the oxygen contained in the combustion mixture. As an approximate indication of this aspect of the matter, such a numerical example as the following may be noted:—1 cbm. of blast-furnace gas, of a calorific value of about 900 calories, requires about 9 cbm. air for combustion. The oxygen content of the mixture of gas and air is .9 times .21, equaling .189 cbm. $O_2$,—which amounts to (.189 times 100, divided by 1.9, equaling) 10% $O_2$. On the other hand, 1 cbm. coke-oven gas, having a calorific value of about 3800 calories, requires about 4.5 cbm. air for combustion. And the oxygen content of this gas and air mixture is 4.5 times .21, equaling .945 cbm. $O_2$,—which amounts to (.945 times 100, divided by 5.5, equaling) 17.2% $O_2$. Thus to secure only 10% of oxygen in a mixture of coke-oven gas and air and stack-gas, the quantity of the gas and air mixture must be (5.5 times 17.2, divided by 10, equaling) 9.46 cbm., so that (9.46 minus 5.5, equaling) 4. cbm. stack-gas must be added to the mixture. In the 9.46 cbm. gas mixture there is .945 cbm. $O_2$, and so 10% $O_2$. Thus 4.5 cbm. air and 4. cbm. stack-gas must be mixed with 1 cbm. of such coke-oven gas to give an oxygen content, in the combustion mixture, substantially equivalent to the oxygen content in a combustion mixture of .9 cbm. air and 1 cbm. of the before-mentioned blast-furnace gas. Of course these proportions are subject to some variation under the varying conditions of actual practice, but the underlying principle is substantially indicated by such an approximate numerical illustration. The main consideration is that the combustion of the coke-oven gas shall be controlled to substantial equivalency with the distribution and moderation of heating that may be secured by employing producer-gas in firing the same extremely elongated combustion chambers of such coke-ovens.

Other objects and advantages of the invention will appear as it is better understood from the following description when considered in connection with the accompanying drawings illustrating a preferred manner of practising my invention.

On the drawings, Figure 1 is a longitudinal fragmentary view of a coking plant equipped with an apparatus embodying my invention shown partially in vertical section and partially in side elevation; Fig. 2 is a transverse vertical view taken substantially on the line 2—2 of Fig. 1; Fig. 3 is a top plan view of a portion of a coking plant and said apparatus, the coking ovens, however, being shown in horizontal section, such section being taken substantially on the line 3—3 of Fig. 4, and the series of combustion chambers being indicated diagrammatically as to position without showing the individual combustion chambers in each series; Fig. 4 is a transverse vertical sectional view through the plant on which are indicated the directions of flow of the air and gas; Fig. 5 is a sectional view taken substantially on the line 5—5 of Fig. 4; Fig. 6 is a horizontal section taken substantially on the line 6—6 of Fig. 5. Fig. 7 is an enlarged partial side elevation of the coking ovens shown in Fig. 1; Figs. 8 and 9 are enlarged detail views showing the valve operating mechanisms in the positions they assume simultaneously on opposite sides of said plant. Fig. 10 is a top plan view of the operating mechanism shown in Fig. 8. Fig. 11 is an enlarged section through one of the inlet valves to a regenerator of the plant; Fig. 12 is a view similar to Fig. 4 and showing the application of my invention to a "plain or simple coke oven as contradistinguished from a combination" coke and gas oven; and Figs. 13, 14 and 15 are partial views taken similarly to Figs. 7, 6 and 5 through the oven shown in part in Fig. 12.

For the purpose of illustrating my invention I have shown its application on the drawings to coking plants in which are incorporated either coking ovens of the "combination" type or the "plain" type, the "combination" type providing for either preheating the fuel gas by passing it through the regenerators or admitting it without preheating directly to the combustion chambers, and the "plain" type leading it directly to the combustion chambers without any provision for preheating.

The application of the invention to coking plants provided with coking ovens of the "combination" type is shown in Figs. 1 to 11 inclusive, from which it will be noted that a plurality of coking chambers 21 alternate with series 22 of combustion chambers 23, said coking chambers having openings 21' through their top for the admission of the coal to be converted into coke. The chambers 21 and 23 are constructed by providing suitable walls of highly refractory material, the coking chambers extending clear across the oven, as seen in Fig. 6, and the combustion chambers being in series and each of small cross-section and much elongated vertically. In each combustion chamber three inlets are provided, two, 24, (those shown of square configuration in Fig. 6) being adapted both to admit air, or one to admit air and the other to admit fuel gas that has passed through the regenerator, as will be later described; and the third inlet, 25, being adapted to admit, from a main 26, fuel gas which has not passed through the regenerator. These inlets all open vertically into the combustion chambers so that air and gas issuing from them will move vertically and in substantial parallelism. Two sets 27 of regenerators 32 are provided in connection with the coking plant and extend throughout the length of the battery of ovens, one set beneath each transverse half. These regenerators (Fig. 5) in the combination oven are laterally separated by a plurality of main dividing walls 28 and partition walls 29, the partition walls serving to divide each space between the main division walls 28 to provide a pair of regenerators therebetween. A main division wall 28 is positioned beneath each combustion chamber and a partition wall 29 beneath each coking chamber. A passageway 31 communicates with the regenerator 32 formed by these walls and with the interior of the combustion chamber and has outlet in an aperture 24. From Fig. 5 it will be seen that the two regenerators provided on each side of each main wall 28 communicate with the combustion chambers 23 immediately above this wall so that if it be desired to pass the fuel gas through regenerators this gas may be admitted to adjacent regenerators, separated by a partition wall 29, from a main 33, through suitable connections (which will be later described more in detail) that lead into alternate pairs of regenerators, as for example those indicated at $a, a$, while air may be admitted to the remaining regenerators or those indicated by $b, b$. Such an arrangement, it will be readily seen, permits the admission of air and fuel gas into each combustion chamber 23.

If the fuel gas is to be introduced into the combustion chambers 23 without being preheated by the regenerators, it is conducted through the pipe or main 26 which connects at proper intervals with a cross-pipe or main 36 extending beneath each set or series of combustion chambers and from which suitable connections lead to the apertures or inlets 25. The two sets of regenerators 27 are alternately operable, one heating the air, or the air and fuel gas, while the other is becoming heated by the hot burnt gases from the combustion chambers. Each series of combustion chambers is open at 37 throughout its length above the tops of the walls 38 which separate the individual combustion chambers 23, as shown in Fig. 4. The burnt gas resulting from combustion in the combustion chambers 23, which are located above the regenerators preheating the air or the fuel gas, flows from these chambers and passes over and down through the remaining chambers or the chambers communicating with the other regenerators (Fig. 4) through which the are drawn into a flue 39 communicating with the stack 41, as will be later described. The regenerators 32 communicate with the flue 39 through a connection 42 shown on an enlarged scale in Figs. 10 and 11. This connection comprises a valve chamber 43 leading at one end 44 to a passageway 45 communicating with the flue 39 and at the other end 46 with the entrance 47 of the regenerator 32. The passageway 45 is adapted to be closed by a mushroom valve 48 co-acting with a suitable seat 49 and operable by a mechanism which will be later described and which causes all of the passageways 45 leading to one flue 39 to be simultaneously opened by the valves 48 and the passageways 45 leading to the other flue 39 to be simultaneously closed. The air is admitted to each regenerator through an opening 51, adapted to be closed by a valve 52 and provided to communicate with each connection 42, the valve 52 and the valve 48 of each connection being actuated by a common control to be now described.

A cable 53 extends along each side of the plant adjacent the tops of the connections 42 and upon this cable are secured suitable stops or clamps 54 appropriately spaced to move past the connection when the cable is operated. The valve operating mechanisms are substantially duplicates of each other and only one, therefore, will be described. Two arms 55 (Figs. 8, 9 and 10) extend upwardly from the top of each connection 42 and carry in their upper ends a normally rotatable shaft 56. Upon one end of the shaft is normally fixed an arm 57 bifurcated at its lower end 58. The cable 53 extends through this bifurcated end and is held in position by a pulley 59 carried in the end of the arm. Fixed also upon the shaft 56 is a forwardly extending arm 61, to the free end of which a chain or other flexible connection 62 is secured, which is adapted to lift the mushroom valve 48 when the shaft 56 is moved from the position shown in Fig. 9 to that shown in Fig. 8. Swinging of the arm 57 will therefore open and close the valve 48. A bell crank 63 is pivoted on the top of the connection 42 at 64 and has an arm extending over the valve 52 and connected thereto by a pivot pin 65. A rod 66 is pivotally connected to the bell crank at 67 and extends through a slot in the arm 69, which is fast on the shaft 56 in parallelism with arm 57. Suitable nuts or stops 68 are provided upon the end of this rod so that swinging of the arm 57 will move the bell crank 63 about its pivot 64 and open and close the valve 52. The stops or clamps are so arranged upon the cable 53 that they will first engage the arms to their left viewing Fig. 9 to move the arms 57 to the left and lift the valves 48 and lower the valves 52 when the cable is moved in one direction and to engage the arms to their right viewing the figure when the cable is moved in the opposite direction to close the main valves 48 and open the air valves 52.

When a lean gas is used it is passed through alternate pairs of regenerators a, a, Fig. 6. The gas enters each regenerator a through a connection 42, a pipe connection 71, Fig. 10, leading from an appropriate main 33, being provided for this purpose, this pipe having an opening into the air inlet 51 of the connection 42. A valve 72 is provided in each pipe 71 and all of these valves 72 are connected by other arms 72' with the cable 53 to enable them to be operated simultaneously with the air valves 52 of the connections 42 connected to the adjacent regenerators b, b. The pivot pins 65 of the valves 52 of the regenerators a, a, which receive the gas, are removed and these valves remain closed and uninfluenced by the valve operating mechanism described. When, however, gas is not passed through the regenerators the main 33 is cut off either by the valves 72 which may be dissociated from the valve operating mechanism and left closed, or by disconnecting the pipes 71 and closing their open ends by suitable closures (not shown). Gas is then admitted to the combustion chambers from the mains 26 through suitable connections 73 which lead to the auxiliary mains 36 and air may be admitted to all regenerators a, a and b, b at an appropriate side of the plant, the valves 52 of the connections 42 leading to the regenerators a, a being connected to the valve operating mechanism for the purpose. In each connection 73 is a suitable valve or cock 74 having an operating arm 75, Figs. 4, 8 and 9. The arms 75 are each connected with a cable 76 at each side of the plant so that all of the valves 74 at each side will open and close together. A similar connection is provided between the valves 72 and the cable 53, which connection has already been described.

When the plant is operating on producer gas or any other lean gas that is slowly combustible and of low calorific value, the burning of the gas in the combustion chambers evenly distributes the heat to the walls between these chambers and the coking chambers, when the gas and air are drawn through the plant by the draft of the stack, for because of the great proportion of inert constituents in such gas and consequently the slow rate at which gas of this character burns the stack draft is able to move the burning gas substantially to the top of the combustion chambers before combustion is complete, producing thereby a flame extending to the top or substantially to the top of each combustion chamber. When, however, it is desired to use a gas rich in hydrogen, such as coke-oven gas, its rapid combustibility prevents the burning of the gas under ordinary conditions above the lower portion of the combustion chambers, concentrating greatly the heat at this portion while the upper parts remain relatively cool. Of late years there has been a marked tendency in the art to which my invention pertains to extend materially the height of the combustion chambers, and also due to numerous changes in the industry, to obtain from the coking ovens a gas for fuel in the combustion chambers of increased hydrogen content, both the increase in height of the combustion chambers and the increase of hydrogen content having rendered more difficult the proper distribution of the heat in the combustion chambers. The coke-oven gas cannot effectively be forced into the combustion chambers under pressure to produce the long flames which would evenly heat their side walls because of the relatively low specific gravity of the gas. The air of combustion being much heavier may be, and in accordance with my invention preferably is, forced through the air inlets at high velocity, the velocity of the air being regulated in accordance with the rate of combustion of the fuel gas and so that the rapidly combustible gas reaches the top or substantially to the top of the combustion chambers before combustion is completed and an elongated flame is produced in each chamber. But this alone does not give the best results, by reason of the fact that for the velocity to be sufficiently increased, the air inlet ports must be restricted, and if they be reduced sufficiently to impart a velocity to the air which will carry it with the burning gas rich in hydrogen clear to the top of the combustion chambers during combustion, the friction of its passage up through the one set of restricted ports into the combustion chambers 23 in which combustion is taking place and thence downwardly through similar restricted ports in the other chambers 23 through which the burnt gas passes to the set of regenerators 27 being heated, requires a substantial loss of power in driving the air, necessitating in large plants either a tremendous stack pull or the utilization of a fan or blower of exceptionally high capacity.

A further disadvantage that appears to be present where velocity of the air alone is relied upon to extend the combustion to near the tops of the combustion chambers is the loss of heat through the too rapid outflow from the regenerators that are being heated. In accordance with my invention it is contemplated that the oxygen content of the air, which has a determining effect upon the rate of combustion, shall be lowered, and this I accomplish by the introduction into the air of combustion, before delivery to the regenerators, of a gas poor in or free from oxygen, flue gas preferably being employed because of its ready availability in plants of this character. The mixture thus formed may be forced into the combustion chambers under pressure or it may merely be introduced in the ordinary manner. The flue gas is mixed with the air and the mixture, instead of natural air alone being introduced into the regenerators through the valves 52, is conveyed to the connections 42 through the stack flue 39, communicating with the regenerators preheating the air, as shown by the arrows at the right of Fig. 4. For this purpose the two flues 39 are connected at one end by a union 81 from which a flue or passage 82 leads to the stack 41, dampers 83 and 84 being provided to cut off either flue 39 from the union. The air is delivered into the flues 39 by a pipe 80 having a branch 85 leading to each flue 39 and communicating with its end at 86. Dampers 87 and 88 are provided to coöperate with the dampers 83 and 84 to establish communication between one flue 39 and the flue 82 and the other flue 39 and air pipe 80, and to alternately reverse the arrangement by shifting the communication between the flues 39 and the air pipe 80 and stack flue 82. When air is delivered to the regenerators through the flues 39 instead of through the valves 52, the valves 52 are all retained in closed position on both sides of the plant and the mushroom valves 48 are all retained in open position. This is accomplished by disposing the valve operating mechanisms in the position shown in Fig. 8, pins 89 being inserted in suitable apertures 91 extending through the bearings in the arms 55 and through the shaft 56, and then removing the means which fixedly secure the arms 57 to the shaft 56. This means in the present instance consists of keys 92 which may be readily withdrawn to permit these arms to move freely under the action of the clamps or stops 54 without affecting the arrangement of the valves or other parts of the valve operating mechanisms.

The flue gas is taken from the passage 82 and mixed with the air near the outer end of the air pipe 80, as seen in Figs. 1 and 3. A pipe 93 leads into the stack flue 82 and is provided with a fan or blower 94 for drawing flue gas from the stack flue. This fan connects by a pipe 95 with the pipe 80 and the pipe 80 receives air from a fan or blower 96. Two fans or blowers are thus provided, one for the flue gas and the other for the air. In the pipe 95 a suitable damper 97 is provided and a similar damper 98 is provided at the air fan 96. This arrangement permits the formation of a predetermined mixture of air and flue gas which may be readily varied in proportion by controlling the rate of rotation of the fans and by adjustment of the dampers 97 and 98. Dampers 99 are also provided in each connection 42 and these dampers are operable by movement of the cable 53 to vary their position in accordance with the regenerators being used for preheating the mixture. If air and gas be entering through a connection 42, a substantially unrestricted opening is desirable through the connection. If, however, flue gas be issuing through a connection to the stack flue, this opening should be stopped down somewhat, as seen in Fig. 8, in order that the flue gas may not be drawn too rapidly through the regenerators being heated. Movement of this damper is accomplished by an arm 101 disposed without the connection and fixed upon the pivotal axis of the damper. The end of the arm is loosely connected by a chain or other flexible medium 102 with an end of a weighted arm 103 pivotally carried on a stop or clamp 54, movement of the cable and the clamps 54 carried thereby swinging the dampers from side to side as the direction of flow of gas through the plant is reversed. Suitable and adjustable stops 104 are provided to protrude across the path of movement of the arm 101 on each side to limit and determine the two positions of the damper. These stops may be fastened at any point in slots 105 provided in a bar 106 which is secured on each connection. Their movement permits adjustment of the extreme positions of the damper under the action of the weighted arm 103.

Figs. 12 to 15 inclusive show the application of my invention to a coking plant providing only for the use of gas which is not to be preheated by the regenerators. This type of plant, however, requires no alteration in the valve apparatus already described or in the practice of the invention. It differs, however, from the plant already described in the following particulars: No partitions are provided between the main walls 111 of the sets of regenerators and two inlets only are provided in each combustion chamber 112, one 113 for the air from the single regenerator 114 between the walls 111, and another 115 for the fuel gas from the branch mains 116, both of these inlets being vertically disposed adjacent the combustion chamber so that the air or mixture and the fuel gas will enter the combustion chamber in currents traveling vertically and in substantially parallel paths. Fuel gas is delivered through the mains 117 communicating with each main 116 through suitable connections 118 provided with valves 119 having operating arms 121 engaging at their ends a cable 122 like the cable 76. The air valves 123 and the main mushroom valves 124 are normally operated by the valve mechanism described in connection with the coking plant using combination ovens and the air valves 123 and the main mushroom valves 124 are held in the position of the valves 52 and 48 in pursuance of my invention in the manner already described, the mechanism for accomplishing this not being shown because it is identically that of the mechanism already described. In other respects the two plants are substantially duplicates of each other and further description is not thought to be necessary.

In each instance the air mixture may be drawn through every regenerator and chamber when the plant is operating in accordance with my invention, the fuel gas mains 33 provided for the introduction of producer gas through the regenerators being cut out and all the mushroom valves 48 of the connections 42 being open to establish communication between the connections and the flues 39.

It will be apparent that upon reducing the percentage of oxygen content in the air, combustion with the rich, rapidly combustible gas (introduced through the inlets 25 or 115) must take place at a slower rate as the combustible particles of gas cannot so readily select and combine with the particles or molecules of oxygen. The increased velocity of the air lifts many of the oxygen particles while they are selecting and combining with the molecules of fuel gas, substantially to the top of the combustion chambers before combustion is completed, distributing thereby the heat substantially evenly over the upright walls of the combustion chambers and in consequence producing an even grade of coke. The time required in coking is materially reduced by reason of the fact that no portion of the coking chambers receives a greater amount of heat than it can utilize safely. The by-products are derived, where my invention is employed, undamaged, by reason of this even distribution of heat and its ready control.

It will be apparent that the rate of combustion can positively and accurately be governed through the various dampers and through the control of the fans to meet the requirements of the particular coal being coked, for, as is well known to those skilled in the art, coking coal varies greatly in its composition and in the treatment needed to produce the best results, both as regards the production of the coke itself and the production of the by-products. It will be apparent also that my invention permits the attainment of a substantially relatively even high heating efficiency, whether gas of low hydrogen content or gas of high hydrogen content be employed, without altering the internal arrangement of the plant. Coking plants designed for the use of producer or other gas of low hydrogen content because of the slow burning nature of gases of this sort must have relatively large port openings and must be given dimensions which will permit this gas to burn at best efficiency. These dimensions and the area of the ports are ordinarily too large for the most efficient utilization of coke-oven or other gas rich in hydrogen. The practice of my invention, however, permits the coke-oven or other gas of high hydrogen content to be used with high efficiency in coking plants constructed primarily for best efficiency when operating with producer or other gas poor in hydrogen. It will be manifest also that the process, as well as the means provided to carry it into effect, may be varied and applied to other uses than that described without departing from the spirit and scope of the invention or sacrificing any of its advantages, the apparatus and application and the particular steps being merely used for the purposes of illustration.

I claim:

1. The process for controlling combustion in coking-ovens which consists in conducting the combustion alternatively with coke-oven gas or with regeneratively preheated producer-gas, and in each instance with air preheated regeneratively, and in the former instance with flue-gas diluent proportioned so to reduce the oxygen-concentration as to effect such elongation of the flame that its heating effect will be distributed with a uniformity substantially equivalent to that of the said alternatively employed producer-gas; substantially as specified.

2. The process for controlling combustion in coking-ovens which consists in conducting the combustion alternatively with a coke-oven gas or with regeneratively preheated producer-gas, and in each instance with air preheated regeneratively, and in the former instance with a neutral gaseous diluent proportioned so to reduce the oxygen-concentration as to effect such elongation of the flame that its heating effect will be distributed with a uniformity substantially equivalent to that of the said alternatively employed producer-gas; substantially as specified.

3. The process for controlling combustion in coking-ovens which consists in conducting the combustion alternatively with coke-oven gas or with producer-gas, and in each instance with preheated air and in the former instance with a neutral gaseous diluent proportioned so to reduce the oxygen-concentration as to effect such elongation of the flame that its heating effect will be distributed with a uniformity substantially equivalent to that of the said alternatively employed producer-gas; substantially as specified.

4. The process for controlling combustion in coking-ovens which consists in conducting the combustion alternatively with a fuel-gas of high hydrogen content or with a regeneratively preheated fuel-gas of low hydrogen content and low calorific value, and in each instance with air preheated regeneratively, and in the former instance with a neutral gaseous diluent proportioned so to reduce the oxygen-concentration as to effect such elongation of the flame that its heating effect will be distributed with a uniformity substantially equivalent to that of the other of said alternatively employed fuel-gases; substantially as specified.

5. The process for controlling combustion in coking-ovens which consists in conducting the combustion alternatively with a fuel-gas of high hydrogen content or with a fuel-gas of low hydrogen content and low calorific value, and in each instance with preheated air, and in the former instance with a neutral gaseous diluent proportioned so to reduce the oxygen-concentration as to effect such elongation of the flame that its heating effect will be distributed with a uniformity substantially equivalent to that of the other of said alternatively employed fuel-gases; substantially as specified.

6. The process for controlling combustion in coking-ovens which consists in conducting the combustion of coke-oven gas with air preheated regeneratively to conserve the heat of the system and with a flue-gas diluent so to reduce the oxygen-concentration as to effect extreme elongation of the flame and uniformity of distribution of its heat, and with a draft proportioned effectively to permit the said regenerative conservation of the heat of the products of combustion; said coke-oven gas and air and diluent being proportioned to effect an elongation of the combustion equivalent to that obtainable in firing with preheated producer-gas; substantially as specified.

7. The process for controlling combustion in coking-ovens which consists in conducting the combustion of coke-oven gas with air preheated regeneratively to conserve the heat of the system and with a neutral gaseous diluent so to reduce the oxygen-concentration as to effect extreme elongation of the flame and uniformity of distribution of its heat, and with a draft proportioned effectively to permit the said regenerative conservation of the heat of the products of combustion; said coke-oven gas and air and diluent being proportioned to effect an elongation of the combustion equivalent to that obtainable in firing with preheated producer-gas; substantially as specified.

8. The process for controlling combustion in coking-ovens which consists in conducting the combustion of a fuel-gas of high hydrogen content with air preheated regeneratively to conserve the heat of the system and with a neutral gaseous diluent so to reduce the oxygen-concentration as to effect extreme elongation of the flame and uniformity of distribution of its heat, and with a draft proportioned effectively to permit the said regenerative conservation of the heat of the products of combustion; said fuel-gas and air and diluent being proportioned to effect an elongation of the combustion equivalent to that obtainable in firing with a fuel-gas of low hydrogen content and low calorific value; substantially as specified.

9. The process for controlling combustion in coking-ovens which consists in conducting the combustion alternatively with coke-oven gas or with regeneratively preheated producer-gas, and in each instance with air preheated regeneratively, and in the former instance with a flue-gas diluent proportioned to reduce the oxygen-concentration to substantial equivalence with that required in the said alternatively employed combustion of producer-gas; substantially as specified.

10. The process for controlling combustion in coking-ovens which consists in conducting the combustion alternatively with a coke-oven gas or with regeneratively preheated producer-gas, and in each instance with air preheated regeneratively, and in the former instance with a neutral gaseous diluent proportioned to reduce the oxygen-concentration to substantial equivalence with that required in the said alternatively employed combustion of producer-gas; substantially as specified.

11. The process for controlling combustion in coking-ovens which consists in conducting the combustion alternatively with coke-oven gas or with producer-gas, and in each instance with preheated air and in the former instance with a neutral gaseous diluent proportioned to reduce the oxygen concentration to substantial equivalence with that required in the said alternatively employed combustion of producer-gas; substantially as specified.

12. The process for controlling combustion in coking-ovens which consists in conducting the combustion alternatively with a fuel-gas of high hydrogen content or with a regeneratively preheated fuel-gas of low hydrogen content and low calorific value, and in each instance with air preheated regeneratively, and in the former instance with a neutral gaseous diluent proportioned to reduce the oxygen-concentration to substantial equivalence with that required in the combustion of the other of said alternatively employed fuel-gases; substantially as specified.

13. The process for controlling combustion in coking-ovens which consists in conducting the combustion alternatively with a fuel-gas of high hydrogen content or with a fuel-gas of low hydrogen content and low calorific value, and in each instance with preheated air, and in the former instance with a neutral gaseous diluent proportioned to reduce the oxygen-concentration to substantial equivalence with that required in the combustion of the other of said alternatively employed fuel-gases; substantially as specified.

14. The process for controlling combustion in coking-ovens which consists in conducting the combustion of coke-oven gas with air preheated regeneratively to conserve the heat of the system and with a flue-gas diluent to effect extreme elongation of the flame and uniformity of distribution of its heat, and with a draft proportioned effectively to permit the said regenerative conservation of the heat of the products of combustion; said coke-oven gas and air and diluent being proportioned to reduce the oxygen-concentration to substantial equivalence with that required in firing with preheated producer-gas; substantially as specified.

15. The process for controlling combustion in coking-ovens which consists in conducting the combustion of coke-oven gas with air preheated regeneratively to conserve the heat of the system and with a neutral gaseous diluent to effect extreme elongation of the flame and uniformity of distribution of its heat, and with a draft proportioned effectively to permit the said regenerative conservation of the heat of the products of combustion; said coke-oven gas and air and diluent being proportioned to reduce the oxygen-concentration to substantial equivalence with that required in firing with preheated producer-gas; substantially as specified.

16. The process for controlling combustion in coking-ovens which consists in conducting the combustion of a fuel-gas of high hydrogen content with air preheated regeneratively to conserve the heat of the system and with a neutral gaseous diluent to effect extreme elongation of the flame and uniformity of distribution of its heat, and with a draft proportioned effectively to permit the said regenerative conservation of the heat of the products of combustion; said fuel-gas and air and diluent being proportioned to reduce the oxygen-concentration to substantial equivalence with that required in firing with a fuel-gas of low hydrogen content and low calorific value; substantially as specified.

17. The process for controlling combustion in coking-ovens which consists in conducting the combustion alternatively with coke-oven gas or with regeneratively preheated producer-gas, and in each instance with air preheated regeneratively, and in the former instance with initial forcing of the draft of said air and with a flue-gas diluent proportioned so to reduce the oxygen-concentration as to effect such elongation of the flame that its heating effect will be distributed with a uniformity substantially equivalent to that of the said alternatively employed producer-gas; substantially as specified.

18. The process for controlling combustion in coking-ovens which consists in conducting the combustion alternatively with a coke-oven gas or with regeneratively preheated producer-gas, and in each instance with air preheated regeneratively, and in the former instance with initial forcing of the draft of said air and with a neutral gaseous diluent proportioned so to reduce the oxygen-concentration as to effect such elongation of the flame that its heating effect will be distributed with a uniformity substantially equivalent to that of the said alternatively employed producer-gas; substantially as specified.

19. The process for controlling combustion in coking-ovens which consists in conducting the combustion alternatively with coke-oven gas or with producer-gas, and in each instance with preheated air and in the former instance with initial forcing of the draft of said air and with a neutral gaseous diluent proportioned so to reduce the oxygen-concentration as to effect such elongation of the flame that its heating effect will be distributed with a uniformity substantially equivalent to that of the said alternatively employed producer-gas; substantially as specified.

20. The process for controlling combustion in coking-ovens which consists in conducting the combustion alternatively with a fuel-gas of high hydrogen content or with a regeneratively preheated fuel-gas of low hydrogen content and low calorific value, and in each instance with air preheated regeneratively, and in the former instance with initial forcing of the draft of said air and with a neutral gaseous diluent proportioned so to reduce the oxygen-concentration as to effect such elongation of the flame that its heating effect will be distributed with a uniformity substantially equivalent to that of the other of said alternatively employed fuel-gases; substantially as specified.

21. The process for controlling combustion in coking-ovens which consists in conducting the combustion alternatively with a fuel-gas of high hydrogen content or with a fuel-gas of low hydrogen content and low calorific value, and in each instance with preheated air, and in the former instance with initial forcing of the draft of said air and with a neutral gaseous diluent proportioned so to reduce the oxygen-concentration as to effect such elongation of the flame that its heating effect will be distributed with a uniformity substantially equivalent to that of the other of said alternatively employed fuel-gases; substantially as specified.

22. The process for controlling combustion in coking-ovens which consists in conducting the combustion of coke-oven gas with air preheated regeneratively to conserve the heat of the system and with a flue-gas diluent to effect extreme elongation of the flame and uniformity of distribution of its heat, and with a stack-draft and initial forcing of the air-draft proportioned to further said elongation of the flame and also effectively to permit the said regenerative conservation of the heat of the products of combustion; said coke-oven gas and air and diluent being proportioned to effect an elongation of the combustion equivalent to that obtainable in firing with preheated producer-gas; substantially as specified.

23. The process for controlling combustion in coking-ovens which consists in conducting the combustion of coke-oven gas with air preheated regeneratively to conserve the heat of the system and with a neutral gaseous diluent to effect extreme elongation of the flame and uniformity of distribution of its heat, and with a stack-draft and initial forcing of the air-draft proportioned to further said elongation of the flame and also effectively to permit the said regenerative conservation of the heat of the products of combustion; said coke-oven gas and air and diluent being proportioned to effect an elongation of the combustion equivalent to that obtainable in firing with preheated producer-gas; substantially as specified.

24. The process for controlling combustion in coking-ovens which consists in conducting the combustion of a fuel-gas of high hydrogen content with air preheated regeneratively to conserve the heat of the system and with a neutral gaseous diluent to effect extreme elongation of the flame and uniformity of distribution of its heat, and with a stack-draft and initial forcing of the air-draft proportioned to further said elongation of the flame and also effectively to permit the said regenerative conservation of the heat of the products of combustion; said fuel-gas and air and diluent being proportioned to effect an elongation of the combustion equivalent to that obtainable in firing with a fuel-gas of low hydrogen content and low calorific value; substantially as specified.

25. In a process for controlling combustion in coking-ovens, the conducting of the combustion with their own gas of distillation and air and such a proportionate admixture of a neutral gaseous diluent as to produce heating conditions and effects substantially equivalent to those obtainable in firing such ovens with an extraneously derived gas such as producer-gas; substantially as specified.

26. In a process for controlling combustion in coking-ovens, the conducting of the combustion alternatively with their own gas of distillation or with an extraneously derived fuel-gas such as producer-gas, and in each instance with air of combustion, and in the former instance with such a proportionate admixture of a neutral gaseous diluent as to produce heating conditions and effects substantially equivalent to those obtained in the firing with the other, alternatively employed fuel-gas; substantially as specified.

In testimony whereof, I have hereunto set my hand in the presence of two subscribing witnesses.

HEINRICH KOPPERS.

Witnesses:
HENRY LOVE CLARKE,
JOSEPH BECKER.

It is hereby certified that in Letters Patent No. 1,176,066, granted March 21, 1916, upon the application of Heinrich Koppers, of Essen-on-the-Ruhr, Germany, for an improvement in "Processes for Controlling Combustion in Coking Plants," errors appear in the printed specification requiring correction as follows: Page 1, line 42, for the word "haved" read *saved;* same page, line 95, for the word "alternations" read *alteration;* page 7, line 130, claim 1, for the words "with flue-gas" read *with a flue gas;* page 10, after line 89, insert the following claim:

*25. A process for controlling combustion in coking plants and the like, employing a rich, rapidly combustible fuel gas, which consists in diluting air with flue gas and forcing it vertically upward from the bottom of a combustion chamber and introducing into the base of the combustion space a rich fuel gas substantially in parallelism with the direction of flow of said diluted air, to prolong the combustion of said fuel gas until it reaches the top of said chamber and thus evenly heat the upright walls of said chamber with an elongated laterally restricted flame, substantially as specified.;* same page, line 90 as now numbered, for the numeral "25" read *26;* same page, line 100, for the numeral "26" read *27;* and that the said Letters Patent should be read with these corrections therein that the same may conform to the record of the case in the Patent Office.

Signed and sealed this 16th day of May, A. D., 1916.

[SEAL.]

Cl. 202—8

J. T. NEWTON,

*Acting Commissioner of Patents.*